(12) United States Patent
Konno

(10) Patent No.: US 6,906,833 B1
(45) Date of Patent: Jun. 14, 2005

(54) CONSTANT SPEED IMAGE READING DEVICE AND METHOD

(75) Inventor: Masaaki Konno, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/562,023

(22) Filed: May 1, 2000

(30) Foreign Application Priority Data

Apr. 30, 1999 (JP) ........................................... 11-124100

(51) Int. Cl.⁷ ............................................... H04N 1/04
(52) U.S. Cl. ...................... 358/487; 358/474; 358/444; 355/77; 355/40
(58) Field of Search ................................ 358/487, 474, 358/444, 452, 486, 409, 412, 302, 296, 404; 355/77, 38, 40

(56) References Cited

U.S. PATENT DOCUMENTS

| | | | | |
|---|---|---|---|---|
| 5,448,377 A | * | 9/1995 | Kinoshita et al. | 358/452 |
| 5,475,493 A | * | 12/1995 | Yamana | 356/404 |
| 5,488,450 A | * | 1/1996 | Tanibata | 355/38 |
| 5,745,262 A | * | 4/1998 | Tatsumi | 358/504 |
| 6,266,127 B1 | * | 7/2001 | Iida | 355/38 |

FOREIGN PATENT DOCUMENTS

JP 11-075028 * 3/1999

* cited by examiner

Primary Examiner—Mark Wallerson
Assistant Examiner—Heather D. Gibbs
(74) Attorney, Agent, or Firm—Sughrue Mion, PLLC

(57) ABSTRACT

An image reading device in which a processing time required for prescanning and fine-scanning of a film can be shortened. A reading system for prescanning which performs prescanning and a reading system for fine-scanning which performs fine-scanning are adjacently juxtaposed on a conveying path of a photographic film. Prescanning is carried out by the reading system for prescanning, which is structured such that light that is emitted from a light source is transmitted through the photographic film, which is conveyed at a constant speed which is suitable for fine-scanning, the light is detected by a linear CCD, and frame images at the photographic film are thereby preliminarily read. Then, fine-scanning is carried out with the photographic film being conveyed at the same speed and the frame images on the photographic film being read at the reading system for fine-scanning by a quantity of light controlled on the basis of reading results of prescanning.

19 Claims, 3 Drawing Sheets

CONSTANT SPEED IMAGE READING DEVICE AND METHOD

BACKGROUND OF THE INVENTION

1. Field of the Invention

The present invention relates to an image reading device which, while a film on which a plurality of frame images have been recorded is being conveyed, reads light transmitted through or reflected by the frame images so as to obtain image data.

2. Description of the Related Art

Technology for forming images onto recording materials as follows has come to be known in recent years. Frame images recorded on an original such as a film are photoelectrically read by a reading sensor such as a CCD. Image processing such as enlargement/reduction and various types of correction is then carried out on digital image data obtained by this reading. Images are then formed at recording materials by laser light modulated on the basis of the image-processed digital image data.

In this technology for digitally reading frame images by a reading sensor such as a CCD, in order for image reading to be performed accurately, the frame images are read preliminarily (which is known as prescanning), reading conditions (e.g., quantities of light to be illuminated onto the frame images, charge accumulation times of the CCD and the like) corresponding to density and the like of the frame images are thereby determined, and the frame images are read again under the determined reading conditions (which is known as fine-scanning).

Prescanning and fine-scanning are carried out by one optical system. Namely, first, in prescanning, light emitted from a halogen lamp is transmitted through the conveyed film, this transmitted light is detected by the CCD sensor, and the frame images on the film are thereby read. Then, based on results of prescanning for each frame image, the reading conditions for fine-scanning are respectively set for each frame image.

After the reading conditions for fine-scanning have been set for all of the frame images, the film is conveyed in a direction opposite to a direction in which the film was conveyed during prescanning, and fine-scanning is carried out for each frame image.

In fine-scanning, because the film is conveyed in the direction opposite to the direction in which it was conveyed during prescanning, fine-scanning is carried out sequentially from a last frame to a first frame. A conveying speed for fine-scanning is set at a speed slower than for prescanning, and reading resolution thereby increases correspondingly.

However, in the above-described method, all of the frame images on the film are prescanned and then the film is conveyed in the opposite direction and all of the frame images are fine-scanned. Therefore, a large amount of time is needed from the start of prescanning to the end of fine-scanning.

SUMMARY OF THE INVENTION

In order to solve the above-described problem, an object of the present invention is to provide an image reading device in which a time required for prescanning and fine-scanning can be shortened.

The first aspect of the present invention is an image reading device which, while a film is conveyed at a constant speed, reads frame images recorded on the film, comprising: a prescanning portion including a first light source portion, which illuminates the film with a quantity of light that enables reading of density of the frame images, and a first reading portion, which reads one of transmitted light and reflected light from the film; and a fine-scanning portion including a second light source portion, which illuminates the film with a quantity of light controlled on the basis of reading results at the prescanning portion, and a second reading portion, which reads one of transmitted light and reflected light from the film.

The film is conveyed along the conveying path at a constant speed. At the prescanning portion, a fixed quantity or a predetermined-controlled quantity of light, which is substantially sufficient to read density of the frame images, is emitted from the first light source portion to the frame images recorded on the film. The light that illuminates the film is one of transmitted through and reflected by the film, and is read at the first reading portion (first sensor), e.g., a line sensor.

Then, prescanned film (a frame image) is conveyed to the fine-scanning portion. At the fine-scanning portion, a variably controlled quantity of light based on reading results of the prescanning portion is emitted from the second light source portion. This light is one of transmitted through and reflected by the film, and is read at the second reading portion (second sensor), e.g., a line sensor.

Therefore, while the film is being conveyed at the constant speed, prescanning and fine-scanning can be continuously carried out by the prescanning portion and the fine-scanning portion, respectively. Accordingly, compared with a case in which prescanning and fine-scanning are conventionally carried out by one optical system, a processing time required for prescanning and fine-scanning can be shortened.

The second aspect of the present invention is an image reading device which, while a film is conveyed, reads frame images recorded on the film, comprising: a prescanning portion which reads the frame images; and a fine-scanning portion which reads the frame images more accurately than the prescanning portion; wherein reading of the frame images at the prescanning portion and reading of the frame images at the fine-scanning portion are carried out while the film is conveyed in one direction.

The third aspect of the present invention is an image reading method for, while a film is conveyed, reading frame images recorded on the film, comprising: a first reading step of reading the frame images preliminarily; and a second reading step of reading the frame images more accurately than the first reading step; wherein the first reading step and the second reading step are carried out while the film is conveyed in one direction.

The fourth aspect of the present invention according to the first aspect is an image reading device, wherein the prescanning portion and the fine-scanning portion are provided adjacent each other at a conveying path of the film.

Because the prescanning portion and the fine-scanning portion are provided adjacent each other at the conveying path of the film, while the film is conveyed at a constant speed, fine-scanning can be conducted by the fine-scanning portion immediately after prescanning has been conducted by the prescanning portion. Accordingly, prescanning and fine-scanning can be continuously conducted, and the processing time can be further shortened.

The fifth aspect of the present invention according to the first aspect is an image reading device, wherein a quantity of light emitted from the second light source portion is controlled so as to be no more than a quantity of light emitted from the first light source portion.

Because a quantity of light emitted from the second light source portion is controlled so as to be no more than a quantity of light emitted from the first light source portion, during the fine scanning, the quantity of the light emitted from the second light source can be controlled so as to control the light in a light output range which allows control of the light to be more stable.

The sixth aspect of the present invention according to the fourth aspect is an image reading device, wherein the first and second light source portions include groups of LED elements in which the quantities of light can be controlled by one of electric current and duty cycles.

The seventh aspect of the present invention according to the first aspect is an image reading device, wherein a quantity of light emitted from the second light source portion is controlled so as to vary at predetermined levels on the basis of reading results at the prescanning portion.

Because a quantity of light emitted from the second light source portion is controlled so as to vary (e.g., vary at predetermined levels) on the basis of reading results at the prescanning portion, the quantity of light emitted from the second light source portion can be easily controlled.

The eighth aspect of the present invention according to the seventh aspect is an image reading device, which further comprises: a storage portion, which stores shading data; and a correcting means, which corrects reading results at the second reading portion on the basis of the shading data stored at the storage portion; wherein the correcting means corrects the reading results on the basis of the shading data which corresponds to the quantity of light emitted from the second light source portion.

Because the correcting means corrects the reading results at the second reading portion on the basis of the shading data which corresponds to the quantity of light emitted from the second light source portion, harmful effects of shading can be eliminated from reading images more certainly.

The ninth aspect of the present invention according to the first aspect is an image reading device, wherein the prescanning portion includes a first diffusing portion which diffuses light emitted from the first light source portion such that the light diffused by the first diffusing portion illuminates the film, and the fine-scanning portion includes a second diffusing portion which diffuses light emitted from the second light source portion such that the light diffused by the second diffusing portion illuminates the film; wherein a degree of light diffusion at the second diffusing portion is larger than a degree of light diffusion at the first diffusing portion.

Because a degree of light diffusion at the second diffusing portion is larger than a degree of light diffusion at the first diffusing portion, the directivity (number of directions) of the light illuminated onto the film increases. Namely, if there is blemish or the like on the film, the light is illuminated onto the blemish on the film from a large number of directions. In this case, even if a light from one direction is deflected by the blemish and thus cannot be read at the sensor, lights from other directions can be read at the sensor. Accordingly, the blemish on the film does not result in a conspicuous blemish on the image obtained from the film.

DESCRIPTION OF THE PREFERRED EMBODIMENTS

Figure 1:
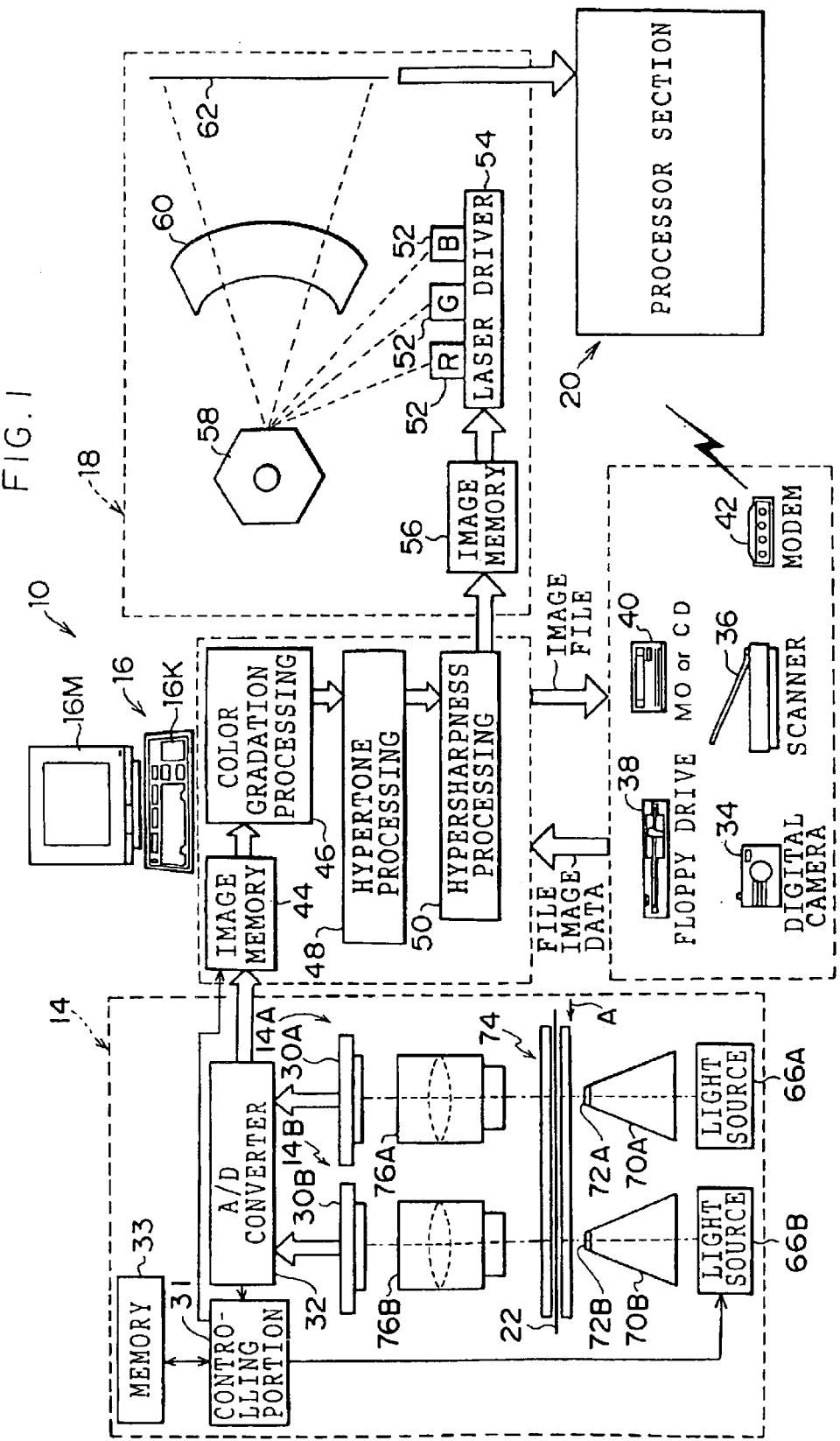
FIG. 1 is a schematic structural view of a digital laboratory system using an image reading device according to an embodiment of the present invention.
Figure 2:
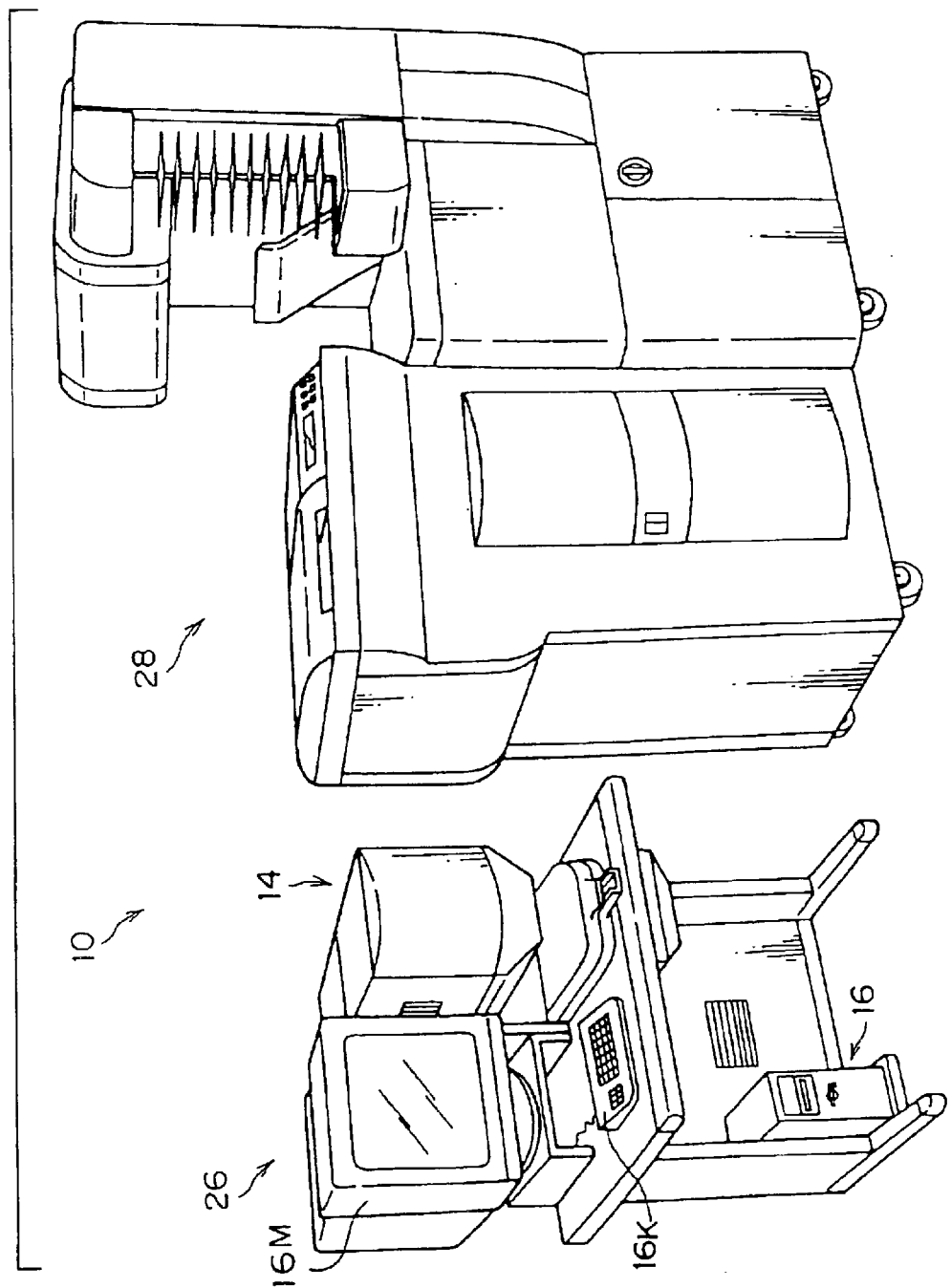
FIG. 2 is an external view of the digital laboratory system of FIG. 1.

FIGS. 1 and 2 show a schematic structure of a digital laboratory system 10 using an image reading device 14 relating to an embodiment of the present invention.

As shown in FIG. 1, this digital laboratory system 10 includes a linear CCD scanner 14, an image processing section 16, a laser printer section 18 and a processor section 20. The linear CCD scanner 14 and the image processing section 16 are integrated as an input section 26, shown in FIG. 2. The laser printer section 18 and the processor section 20 are integrated as an output section 28, shown in FIG. 2.

The linear CCD scanner 14 is used to read frame images recorded on photographic films such as negative films, reversal films and the like. The linear CCD scanner 14 can read frame images on, for example, the following types of photographic films: 135 size photographic films, 110 size photographic films, photographic films on which a transparent magnetic layer is formed (240 size photographic films, known as APS films), and 120 size and 220 size (Brownie size) photographic films.

The linear CCD scanner 14 reads frame images of one of the above-mentioned photographic films, which is an object of reading, at linear CCDs 30A and 30B, conducts A/D conversion at an A/D converter 32, and then outputs the converted image data of the read frame images to the image processing section 16.

A controlling portion 31 is electrically connected to the A/D converter 32, and a light source 66B (described later) is electrically connected at an output side of the controlling portion 31. Therefore, the image data is outputted to the controlling portion 31, and light emission instructions based on image data of a photographic film 22 are outputted from the controlling portion 31 to the light source 66B, and a quantity of light that is controlled on the basis of the light emission instructions is emitted from LED chips 64B. The quantity of light emitted from the light source 66B is controlled by the controlling portion 31 such that which quantity is no more than a quantity of light emitted from the light source 66A. Further, as described later in detail, the quantity of light emitted from the light source 66B is controlled by the controlling portion 31 such that which quantity varies at steps (four steps) on the basis of the image data.

Further, a memory (storage portion) 33 is electrically connected to the controlling portion 31. Shading data (of four types) is stored at the memory 33, which each shading data corresponds to the quantity of light varied at the respective step that is emitted from the light source 66B. Therefore, the controlling portion 31 takes out one type of shading data, which corresponds to the quantity of light emitted from the light source 66B, among four types of shading data stored at the storage portion 33, and corrects the frame image read at the linear CCD 30B.

In the present embodiment, description will be given of the digital laboratory system 10 when applied to a 135 size photographic film 22.

The image processing section 16 is structured such that the image data (scan image data) outputted from the linear CCD scanner 14 can be inputted, and also the following types of image data can be inputted from an external section: image data obtained by photography using a digital camera 34 or the like; image data obtained by reading originals (e.g., reflective originals and the like) with a scanner 36 (a flatbed-type scanner); image data generated by another computer and recorded on a floppy disk drive 38, or an MO drive or CD drive 40; communication image data received via a modem 42; and the like (hereinafter, such image data will be generically referred to as file image data).

At the image processing section 16, the inputted image data is stored at an image memory 44, and is subjected to image processing, which is various types of correction and the like, at a color gradation processing portion 46, a hypertone processing portion 48, a hypersharpness processing portion 50 and the like. Then, the image data which has been subjected to the image processing is outputted to the laser printer section 18 as image data for recording. Alternatively, the image processing section 16 can output the image data which has been subjected to the image processing to an external section as an image file (for example, the image data can be outputted to a storage medium such as an FD, an MO or a CD, or transmitted to another information processing device via a communication line).

The laser printer section 18 is provided with R, G and B laser light sources 52. Laser light, which is modulated by control of a laser driver 54 in accordance with the image data for recording that has been inputted from the image processing section 16 (which data is stored in an image memory 56), is illuminated onto photographic printing paper 62. An image is recorded at the photographic printing paper 62 by scanning exposure (in the present embodiment, an optical system principally uses a polygon mirror 58 and an f-θ lens 60).

The processor section 20 performs various processes on the photographic printing paper 62, at which the image has been recorded by scanning exposure at the laser printer section 18, such as color development, bleach fixing, rinsing and drying. As a result, the image is formed on the photographic printing paper 62.

Figure 3:
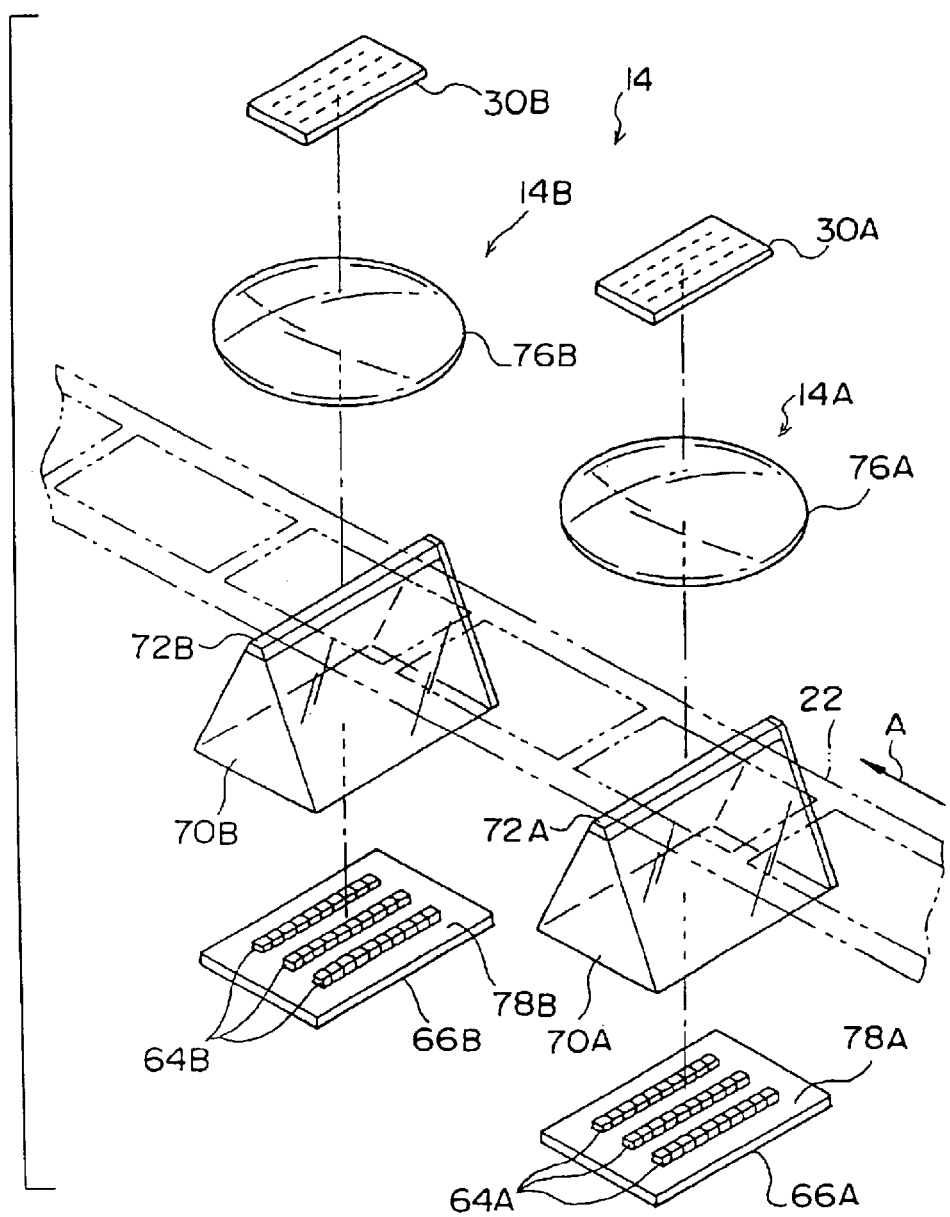
FIG. 3 is a perspective view showing a schematic structure of the image reading device.

Next, the structure of the linear CCD scanner 14 will be described. FIGS. 1 and 3 show a schematic structure of optical systems of the linear CCD scanner 14. As shown in FIGS. 1 and 3, a linear CCD scanner for prescanning 14A (hereinafter referred to as a reading system for prescanning) and a linear CCD scanner for fine-scanning 14B (hereinafter referred to as a reading system for fine-scanning) are juxtaposed in a mutually adjacent state at a conveying path of the photographic film 22. In the present embodiment, a distance between an optical axis of the reading system for prescanning 14A and an optical axis of the reading system for fine-scanning 14B is 100 mm.

In the reading system for prescanning 14A, a light source 66A, in which a plurality of LED chips 64A are mounted with high density at an aluminum base plate 78A, and which emits one of fixed-quantity light and pulse-controlled light (hereinafter referred to simply as light) to the photographic film 22, is provided. Further, an acrylic block 70A, which serves as a light-guiding member which makes the light emitted to the photographic film 22 the diffused light, and a light-diffusing plate 72A are sequentially disposed at an emission side of the light source 66A.

A lens unit 76A and the linear CCD 30A are sequentially disposed along the reading system for prescanning 14A optical axis at a side of the photographic film 22, which side is opposite to a side thereof at which the light source 66A is disposed. The lens unit 76A focuses light transmitted through the frame images to the linear CCD 30A. Although the lens unit 76A is shown as a single lens in FIG. 3, in practice the lens unit 76A is a zoom lens formed by a plurality of lenses.

Three sensing portions, which are mutually spaced and parallel, are provided at the linear CCD 30A. Each sensing portion is disposed in a line along a transverse direction of the photographic film 22 and is provided with an electronic shutter mechanism. R, G and B color-separating filters are respectively attached at light incident sides of the respective sensing portions. The linear CCD 30A is disposed such that a light-receiving surface of each sensing portion corresponds with a position of a focusing point of the lens unit 76A. Further, the linear CCD 30A is controlled such that, if light is emitted from the LED chips 64A in predetermined-controlled pulses, the linear CCD 30A accumulates image information while the pulsed light is being emitted, i.e., such that the image information is read at predetermined reading times.

A transferring portion corresponding to each sensing portion is provided near the each sensing portion. Charge accumulated in each CCD cell of each sensing portion is sequentially conveyed via corresponding transferring portions. Although also not shown, a shutter is provided between the linear CCD 30A and the lens unit 76A.

In the reading system for fine-scanning 14B, the light source 66B, in which the plurality of LED chips 64B are mounted with high density at an aluminum plate 78B, and which emits one of fixed-quantity light and pulse-controlled light (hereinafter referred to simply as light) to the photographic film 22, is provided. Further, an acrylic block 70B, which serves as a light-guiding member which makes the light emitted to the photographic film 22 the diffused light, and a light-diffusing plate 72B are sequentially disposed at an emission side of the light source 66B. A degree of light diffusion of the light-diffusing plate 72B is larger than that of the light-diffusing plate 72A of the reading system for prescanning 14A.

On the other hand, a lens unit 76B and the linear CCD 30B are sequentially disposed along the reading system for fine-scanning 14B optical axis at a side of the photographic film 22, which side is opposite to a side thereof at which the light source 66B is disposed. The lens unit 76B focuses light transmitted through the frame images to the linear CCD 30B. Although the lens unit 76B is shown as a single lens in FIG. 3, in practice the lens unit 76B is a zoom lens formed by a plurality of lenses.

Three sensing portions, which are mutually spaced and parallel, are provided at the linear CCD 30B. Each sensing portion is disposed in a line along the transverse direction of the photographic film 22 and is provided with an electronic shutter mechanism. R, G and B color-separating filters are respectively attached at light incident sides of the respective sensing portions. The linear CCD 30B is disposed such that a light-receiving surface of each sensing portion corresponds with a position of a focusing point of the lens unit 76B. Further, the linear CCD 30B is controlled so as to accumulate image information while pulsed light, which is variably controlled by the controlling portion 31, is being emitted, i.e., such that the image information is read at predetermined reading times.

Next, operation of the present embodiment will be described.

When an operator has inserted the photographic film 22 into a film carrier 74 and selected commencement of reading of frame images at a keyboard 16K of the image processing section 16, conveyance of the photographic film 22 at the film carrier 74 is begun.

Due to this conveyance, prescanning is carried out at the reading system for prescanning 14A. Namely, the photographic film 22 is conveyed in a direction of an arrow A at a constant low speed, which is suitable for fine-scanning, a fixed quantity of light (high output) or predetermined-controlled (e.g., pulse-controlled) light, which is substantially sufficient for reading of the full range of density of the frame images on the photographic film 22, is emitted from the LED chips 64A and the light transmits through the acrylic block 70A and illuminates the photographic film 22. The quantity of light emitted from the light source 66A can be controlled by electric current or duty cycles.

Almost all of light of each color that is emitted from the LED chips 64A is guided toward the light-diffusing plate 72A via the acrylic block 70A. The light is incident at the photographic film 22 in a state in which the lights of each color are mixed together equally.

The light that is incident at the photographic film 22 transmits through the photographic film 22, and is focused to the linear CCD 30A by the lens unit 76A.

In this way, the reading system for prescanning 14A reads not only each frame image but also the various types of data which are outside image recording regions of the photographic film 22.

The read images are displayed on a monitor 16M and subjected to A/D conversion at the A/D converter 32, and then outputted to the controlling portion 31 as image data.

Then, based on results of prescanning for each frame image, reading conditions for fine-scanning are set for the each frame image. Particularly, the quantity of light for fine-scanning is variably controlled by the controlling portion 31. For example, if the controlling portion 31 has determined that a large quantity of light is required for fine-scanning, a large quantity of light is emitted from the LED chips 64B.

After the reading conditions for fine-scanning have been set for the each frame image, fine-scanning is successively carried out by the reading system for fine-scanning 14B for the each frame image on the photographic film 22, which is being conveyed downstream at the constant speed.

Because the photographic film 22 is being conveyed in the same direction as the direction for prescanning, fine-scanning is carried out sequentially from a first frame to a last frame.

At a start of fine-scanning, a quantity of light of each color is emitted from each of the LED chips 64B of the light source 66B, which quantity is variably controlled by the controlling portion 31 on the basis of the reading results of prescanning. Specifically, a quantity of light of each color is emitted from the LED chips 64B, which quantity is no more than a quantity of light emitted from the LED chips 64A, by the controlling portion 31, based on the reading results of prescanning. Accordingly, during the fine scanning, the quantity of the light emitted from the LED chip 64B can be controlled so as to control the light in a light output range which allows control of the light to be more stable.

Further, a quantity of light emitted from the LED chips 64B is controlled by the controlling portion 31 such that which quantity varies at steps (at predetermined levels) on the basis of the results of prescanning.

Control of a quantity of light emitted from the LED chips 64B will be now described.

A value of DP maximum density of light that is read at the linear CCD 30A with respect to DM maximum density of light that can be read at the linear CCD 30A, i.e., a density determining value DX (=DP/DM) is calculated at the controlling portion 31. Then, as shown in the following Table 1, a quantity of light emitted from the light source 66B is determined based on the calculated value of DX.

TABLE 1

| Condition for determining | Quantity of light for fine-scanning (DF) |
|---|---|
| DX ≦ 0.1 | quantity of light corresponding to 0.1 DM |
| 0.1 < DX ≦ 0.4 | quantity of light corresponding to 0.4 DM |
| 0.4 < DX ≦ 0 7 | quantity of light corresponding to 0.7 DM |
| 0.7 < DX ≦ 1.0 | quantity of light corresponding to DM |

As shown-in the above Table 1, when a density determining value DX is 0.1 or less, a quantity of light corresponding to 0.1 DM is emitted from the light source 66B. When DX is more than 0.1 and is 0.4 or less, a quantity of light corresponding to 0.4 DM is emitted from the light source 66B. When DX is more than 0.4 and is 0.7 or less, a quantity of light corresponding to 0.7 DM is emitted from the light source 66B. When DX is more than 0.7 and is 1.0 or less, a quantity of light corresponding to DM is emitted from the light source 66B.

As described above, a quantity of light emitted from the light source 66B is controlled by the controlling portion 31 such that which quantity varies at steps. The quantity of light emitted from the light source 66B can be easily controlled by varying at steps in this manner. Namely, compared with a case, for example, in which the quantity of light emitted from the light source 66B is controlled at no steps based on the reading results of prescanning, the quantity of light emitted from the light source 66B can be more easily controlled by dividing range of DX (the range is from 0 to 1) into plural regions in advance, by setting quantity levels of light corresponding to the respective regions in advance, and by emitting the quantity levels of light corresponding to the respective regions from the light source 66B. The quantity of light emitted from the light source 66B can be controlled by electric current or duty cycles.

Further, the lights of each color emitted from the light source 66B as described above are incident at the photographic film 22 in a state of having been mixed together equally by the acrylic block 70B. Light that is incident at the photographic film 22 transmits through the photographic film 22, and is focused to the linear CCD 30B by the lens unit 76B.

Because a degree of light diffusion of the light-diffusing plate 72B of the reading system for fine-scanning 14B is larger than a degree of light diffusion of the light-diffusing plate 72A of the reading system for prescanning 14A, the directivity (number of directions) of the light illuminated onto the film 22 increases. Namely, if there is blemish or the like on the film 22, the light is illuminated onto the blemish on the film 22 from a large number of directions. In this case, even if a light from one direction is deflected by the blemish and thus cannot be read at the linear CCD 30B, lights from other directions can be read at the linear CCD 30B. Accordingly, the blemish on the film 22 does not result in a conspicuous blemish on the image obtained from the film 22.

In this manner, during prescanning, a state of an image (e.g., aspect ratio of a photographed image; conditions of photographing such as underexposure, normal exposure, overexposure, or super-overexposure; whether a flash was used; and the like) is ascertained. Thus, during fine-scanning, the image can be read under appropriate reading conditions.

Next, the reading results read at the linear CCD 30B are corrected by the controlling portion 31 on the basis of shading data. Namely, because, for example, it is difficult to emit light uniformly from the light source 66B to the photographic film 22 and quantities of illuminating light are thereby ununiform, there is a problem such that shading is caused at read images. Therefore, the reading results at the linear CCD 30B are corrected by the controlling portion 31 on the basis of shading data, and harmful effects of shading are prevented from appearing on read images. Although not described in detail, it is preferable that correction of sensitivity for each pixel is conducted as, the correction, as known conventionally.

Four types of shading data, which respectively correspond to the quantities of light (of four types shown in the above Table 1) emitted from the light source 66B, are stored at the memory 33 as shading data. Therefore, shading data, which corresponds to the quantity of light emitted from the light source 66B, is taken out of the memory 33 by the controlling portion 31, and the reading results are corrected. As a result, the reading results can be corrected on the basis of optimal shading data which corresponds to the respective quantity of light, and harmful effects of shading can be eliminated from reading images more certainly.

As described above, in the image reading device of the present invention, the reading system for prescanning 14A and the reading system for fine-scanning 14B are juxtaposed near each other on the conveying path of the photographic film 22. Accordingly, while one frame image is being prescanned, another frame image, which has already been prescanned, can be fine-scanned. Thus, the processing time required for prescanning and fine-scanning can be drastically shortened.

Further, because the conveying speed of the photographic film 22 during prescanning and fine-scanning is constant, there is no need to provide a buffer on the conveying path of the photographic film 22 to adjust the speed. Thus, space required for providing a buffer on the conveying path can be saved. Furthermore, because the conveying speed of the photographic film 22 is a speed which is optimal for fine-scanning, fine-scanning is satisfactory and quality of the image data obtained by fine-scanning is not degraded.

Further, the LED chips 64A and 64B, which are smaller and generate less heat than conventional halogen lamps and the like, are used for the light sources 66A and 66B, respectively. Thus, there is no problem if the reading system for prescanning 14A and the reading system for fine-scanning 14B are juxtaposed (adjacent), as in the present embodiment.

In addition, the present embodiment applies to transmissive films, such as the photographic film 22, but the present invention is also applicable to reading of reflective originals.

Further, in the present embodiment, as the LED chips 64A and 64B, chips with a usual structure, wherein light-emitting chips are embedded in a rectangular resin block, are shown. However, reflective LED chips, with parabolic reflective plates provided and light-emitting chips disposed at light-condensing positions of the parabolic surfaces, may be used. In such a case, light emitted from a light-emitting chip is reflected by a reflective plate and outputted as substantially parallel light. Thus, reflective LED chips are suitable for cases in which images are color-separated for reading.

In accordance with the image reading device of the present invention, as described above, the prescanning portion that performs prescanning and the fine-scanning portion that performs fine-scanning are adjacently provided on the conveying path of the film; the conveying speed of the film during prescanning and fine-scanning is constant; and, while one of the frame images is being prescanned, another frame image which has already been prescanned is being fine-scanned. Accordingly, the processing time required for prescanning and fine-scanning can be shortened, and processing performance can be improved.

Further, differently from prior art, there is no need to control the conveying speed of the film during prescanning and fine-scanning, and no need to convey the film in the direction opposite to the prescanning conveyance direction for fine-scanning. Thus, film conveyance control can be simplified.

What is claimed is:

1. An image reading device which, while a film is conveyed, reads frame images recorded on the film, comprising:

a prescanning portion which reads the frame images; and a fine-scanning portion which reads the frame images more accurately than said prescanning portion;

wherein said prescanning portion is provided at an upstream side, with respect to a film conveyance direction, of said fine-scanning portion, and reading of the frame images at said prescanning portion and reading of the frame images at said fine-scanning portion are carried out, while the film conveyance direction is not changed between the prescanning portion and the fine-scanning portion and a conveyance speed of the film is constant between the prescanning portion and the fine-scanning portion, such that the conveyance speed of the film for reading of a frame image at said prescanning portion is the same as the conveyance speed of the film for reading of the frame image at said fine-scanning portion.

2. An image reading device according to claim 1, wherein after being read at said prescanning portion, each of the frame images is read at said fine-scanning portion without the film being conveyed in a direction opposite to the one direction.

3. An image reading device according to claim 1, wherein said prescanning portion and said fine-scanning portion are provided adjacent each other at a conveying path of the film.

4. An image reading device according to claim 3, wherein a first light source portion of the prescanning portion and a second light source portion of the fine-scanning portion include groups of LED elements in which the quantities of light can be controlled by one of electric current and duty cycles.

5. An image reading device according to claim 1, wherein a quantity of light emitted from a second light source portion of the fine-scanning portion is controlled so as to be no more than a quantity of light emitted from a first light source portion of the prescanning portion.

6. An image reading device according to claim 1, wherein a quantity of light emitted from a second light source portion of the fine-scanning portion is controlled so as to vary at predetermined levels on the basis of reading results at said prescanning portion.

7. An image reading device according to claim 6, which further comprises:

a storage portion, which stores shading data; and a correcting means, which corrects reading results at a second reading portion of the fine-scanning portion on the basis of the shading data stored at said storage portion;

wherein said correcting means corrects the reading results on the basis of the shading data which corresponds to the quantity of light emitted from said second light source portion.

8. An image reading device according to claim 1, wherein said prescanning portion includes a first diffusing portion which diffuses light emitted from a first light source portion of the prescanning portion such that the light diffused by the first diffusing portion illuminates the film and said fine-scanning portion includes a second diffusing portion which diffuses light emitted from a second light source portion of the fine-scanning portion such that the light diffused by the second diffusing portion illuminates the film;

wherein a degree of light diffusion at said second diffusing portion is larger than a degree of light diffusion at said first diffusing portion.

9. An image reading device according to claim 1, wherein the film is conveyed through the prescanning and the fine-scanning portions in a first conveyance.

10. An image reading device according to claim 9, wherein the first conveyance is at the constant speed.

11. An image reading device according to claim 9, wherein the first conveyance is in one direction.

12. An image reading device according to claim 1, wherein the reading of the images at said prescanning portion and the reading of the frame images at said fine-scanning portion are carried out while the film is conveyed in a first conveyance.

13. An image reading device according to claim 1, wherein a first light source portion of the prescanning portion and a second light source portion of the fine-scanning portion include groups of LED elements in which the quantities of light can be controlled by one of electric current and duty cycles.

14. An image reading device according to claim 1 further comprising a straight path extending from the prescanning portion to the fine-scanning portion, wherein the film is conveyed on the straight path.

15. An image reading method for, while a film is conveyed, reading frame images recorded on the film, comprising:

a first reading step of reading the frame images preliminarily; and a second reading step of reading the frame images more accurately than said first reading step;

wherein said first reading step is provided at an upstream side, with respect to a film conveyance direction, of said second reading step, and said first reading step and said second reading step are carried out, while the film conveyance direction is not changed between the first reading step and the second reading step and a conveyance speed of the film is constant between the first reading step and the second reading step, such that the conveyance speed of the film at said first reading step is the same as the conveyance speed of the film at said second reading step.

16. An image reading method according to claim 15, wherein, after said first reading step has been carried out, said second reading step is carried out without the film being conveyed in a direction opposite to the one direction.

17. An image reading device according to claim 15, wherein the first reading step and said second reading step are carried out while the film is conveyed in a first conveyance.

18. An image reading device according to claim 15, wherein said first reading step and said second reading step are carried out contemporaneously while the film is conveyed in one direction.

19. An image reading method according to claim 15 further comprising a film conveyance step of conveying the film along a straight path from the prescanning portion to the fine-scanning portion.

* * * * *